United States Patent
Uro et al.

(10) Patent No.: US 8,625,910 B2
(45) Date of Patent: Jan. 7, 2014

(54) COMPRESSION OF IMAGE DATA

(75) Inventors: Tinic Uro, San Francisco, CA (US); Sebastian Marketsmueller, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 288 days.

(21) Appl. No.: 13/035,569

(22) Filed: Feb. 25, 2011

(65) Prior Publication Data
US 2012/0219233 A1    Aug. 30, 2012

(51) Int. Cl.
G06K 9/36 (2006.01)
G06K 9/46 (2006.01)

(52) U.S. Cl.
USPC .......................... 382/232; 382/234

(58) Field of Classification Search
USPC .................. 382/166, 232, 234, 239, 251
See application file for complete search history.

(56) References Cited

U.S. PATENT DOCUMENTS

| | | | |
|---|---|---|---|
| 5,341,442 A | 8/1994 | Barrett | |
| 5,598,214 A | 1/1997 | Kondo et al. | |
| 5,699,122 A | 12/1997 | Jung | |
| 5,710,838 A | 1/1998 | Jung | |
| 5,742,704 A | 4/1998 | Suzuki et al. | |
| 5,805,226 A | 9/1998 | Jung | |
| 5,956,431 A * | 9/1999 | Iourcha et al. | 382/253 |
| 6,320,981 B1 | 11/2001 | Yada | |
| 6,404,919 B1 | 6/2002 | Nishigaki et al. | |
| 6,744,926 B1 | 6/2004 | Nishigaki | |
| 7,385,611 B1 * | 6/2008 | Toksvig et al. | 345/582 |
| 7,787,691 B2 * | 8/2010 | Strom | 382/166 |
| 2002/0081377 A1 * | 6/2002 | Ohishi et al. | 427/163.2 |
| 2006/0215914 A1 | 9/2006 | Aleksic et al. | |
| 2006/0269127 A1 | 11/2006 | Ogden et al. | |
| 2006/0269152 A1 | 11/2006 | Fenney | |
| 2007/0070078 A1 | 3/2007 | Schilling et al. | |
| 2007/0071333 A1 * | 3/2007 | Strom et al. | 382/239 |
| 2008/0055331 A1 | 3/2008 | Iourcha et al. | |
| 2008/0187218 A1 * | 8/2008 | Strom | 382/166 |
| 2008/0310740 A1 | 12/2008 | Strom et al. | |
| 2009/0051694 A1 | 2/2009 | Pan et al. | |
| 2009/0310873 A1 | 12/2009 | Asano | |
| 2010/0328425 A1 | 12/2010 | Nagaraj et al. | |

OTHER PUBLICATIONS

Jiri Kochanek, et al., "The New Statistical Compression Method: Multistream Compression," IEEE 2008, 6 pages.
Jose L. Paredes, et al., "Multichannel Image Compression by Bijection Mappings Onto Zero-Trees," IEEE Transactions on Image Processing, vol. 11, No. 3, Mar. 2002, 11 pages.

* cited by examiner

Primary Examiner — Phuoc Tran
(74) Attorney, Agent, or Firm — Wolfe-SBMC

(57) ABSTRACT

Image content may be compressed using a plurality of block truncation coding schemes resulting in a plurality of compressed versions of the image content. The plurality of compressed versions may be combined together into a single data structure. Prior to combining the plurality of compressed versions, each compressed version may be further compressed. In one embodiment, a data structure containing a plurality of block truncation encoded format versions of image content may be received. Rendering hardware-compatible block truncation encoded content from the plurality of compressed versions may be determined and provided to rendering hardware. The hardware may then decode the selected one block truncation encoded format for display. In one embodiment, each of the received plurality of block truncation encoded content versions may be further compressed. Before providing the selected version to the hardware for decoding, the further compression may be decompressed.

19 Claims, 9 Drawing Sheets

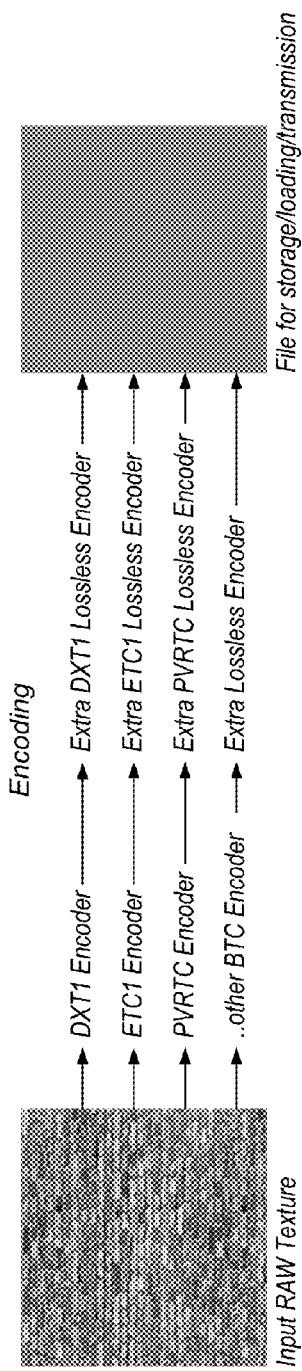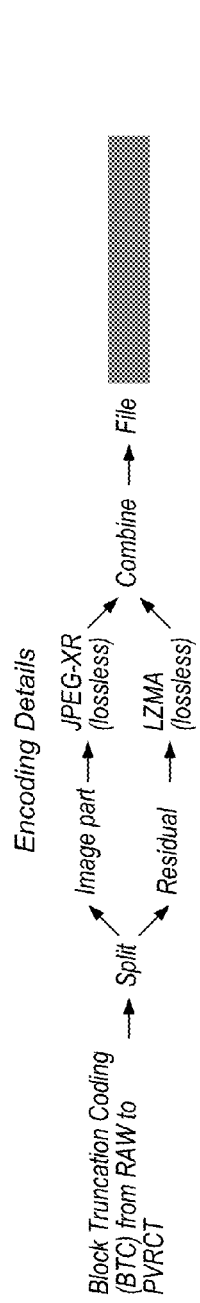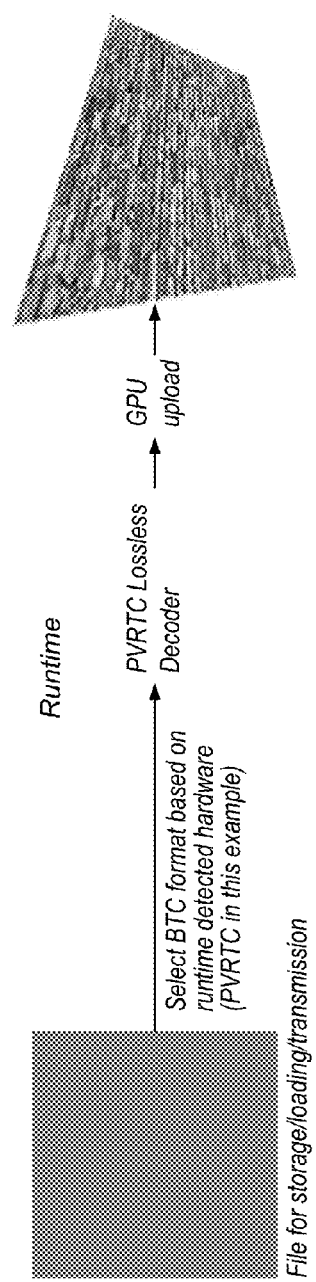
FIG. 6A
FIG. 6B
FIG. 6C

COMPRESSION OF IMAGE DATA

BACKGROUND

1. Technical Field

This disclosure relates generally to compression, and more specifically, to compression of image content.

2. Description of the Related Art

Image data for texturing, which can be very large, is typically stored in resident memory of graphics hardware (e.g., graphics processing units (GPUs)) for use by the graphics hardware. Many GPUs implement some scheme of compression for the texture images, which may be hardware specific, allowing the GPU to read the compressed image directly from memory. For example, at run time, image data is encoded into a format that is compatible with a particular GPU and passed to GPU memory. The GPU can then decode and render the image data.

SUMMARY

This disclosure describes techniques and structures for asymmetrical compression and decompression of data. In one embodiment, content, such as image content, may be received. The content may be encoded using a plurality of block truncation coding schemes resulting in a plurality of block truncation encoded versions of the image content. The plurality of block truncation encoded versions may be combined together into a single data structure. In one embodiment, prior to combining the plurality of block truncation encoded versions, each block truncation encoded version may be further compressed. In one embodiment, further compression, with a compression algorithm different from a block truncation coding scheme, may be applied to the entirety of each block truncation encoded version. In one embodiment, each block truncation encoded version may be split into constituent components and may be further compressed by constituent component type, with a compression algorithm different from a block truncation coding scheme.

In one embodiment, a data structure containing a plurality of block truncation encoded image content versions may be received. The data structure may be read and a block truncation encoded version that is compatible with a particular piece of rendering hardware may be determined and provided to the rendering hardware. The hardware may then decode the selected one block truncation encoded format for display. In one embodiment, each of the received plurality of block truncation encoded format versions may be further compressed with compression algorithm different from a block truncation coding scheme. Before providing the selected version to the hardware for decoding, the further compression may be decompressed.

BRIEF DESCRIPTION OF THE DRAWINGS

FIG. 6a illustrates an example of encoding a RAW texture, according to some embodiments.

FIG. 6b illustrates an example of further compressing an encoded RAW texture, according to some embodiments.

FIG. 6c illustrates an example of selecting a format of compressed image content and decoding the selected format, according to some embodiments.

Figure 1:
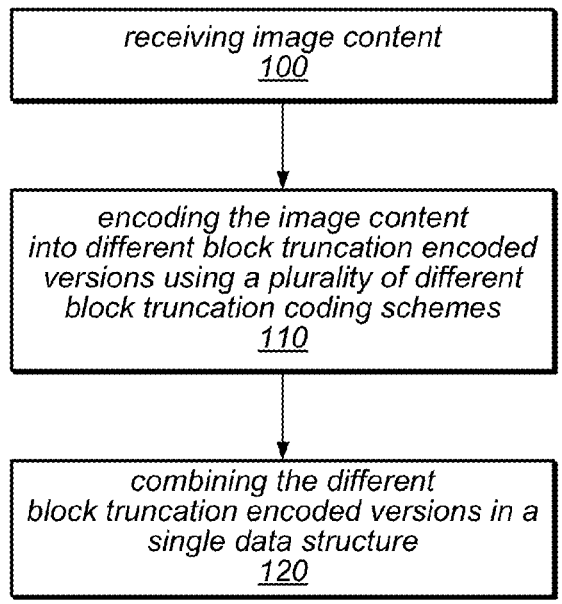
FIG. 1 is a flowchart of a method for encoding image content and combining encoded versions, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, in a computer-readable storage medium having multiple algorithms, the terms "first" and "second" algorithms can be used to refer to any two of the algorithms. In other words, the "first" and "second" algorithms are not limited to logical algorithms 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Digital image editing applications, executed on a computing device, may be used to manipulate, enhance, transform, create and render images, graphics, and videos, such as vector graphics, 3D graphics, and video. Digital image editing applications may be used to render, modify, and edit such objects, according to various embodiments described herein, and may use an application programming interface (API), such as OpenGL, DirectX, or Direct3D.

Various embodiments of methods and apparatus for encoding image content and combining the encoded image content, as well as for selecting a version of compressed media content and providing the selected format to rendering hardware, are described. Some embodiments may include a means for encoding image content and combining the encoded image content and/or a means for selecting a version of encoded content and providing the selected version to rendering hardware. For example, an encoding module may receive image content as input and compress the image content with a block truncation coding algorithm. In one embodiment, encoding module may further compress the same content using a different compression algorithm. A combining module may combine each of the differently compressed content into a single data structure. A selecting module may select an appropriate format of compressed image content for a particular piece of hardware. Selecting module may further provide the selected version to rendering hardware. The encoding, combining, and selecting modules may, in some embodiments, be implemented by program instructions stored in a computer-readable storage medium and executable by one or more processors of a computing apparatus. The computer-readable storage medium may store program instructions executable by the one or more processors to cause the computing apparatus to perform encoding image content and combining the encoded image content and/or selecting a version of compressed image content and providing the selected version to rendering hardware, as described herein. Other embodiments of the encoding, combining, and selecting modules may be at least partially implemented by hardware circuitry and/or firmware stored, for example, in a non-volatile memory.

Turning now to FIG. 1, one embodiment for encoding image content and combining encoded versions is shown. While the blocks are shown in a particular order for ease of understanding, other orders may be used. In some embodiments, the method of FIG. 1 may include additional (or fewer) blocks than shown. Blocks 100-120 may be performed automatically or may receive user input.

As indicated at 100, image content may be received. Image content may include two-dimensional (2D) image data (e.g., texture data), vector graphics, RGB data, a frame of a video, etc. For example, image content may include the 2D wood texture of a 3D graphic of a fence with a 2D wood texture. In such an example, the 2D image portion, the wood texture, may be used for texturing in a 3D rendering of the fence. The texture data may be received in RAW format.

As shown at 110, the image content may be encoded into different block truncation encoded versions using a plurality of different block truncation coding (BTC) schemes. A block truncation encoded version of image content may be referred to, herein, as "BTC content" or a "BTC version." BTC schemes may be asymmetric. Further, the BTC schemes may be block-based texture compression formats with fixed compression ratios. A fixed compression ratio may describe a compression format that compresses pixel blocks that are all of the same size. This is in contrast to a block compression scheme, such as JPEG, where every compressed block may have a different size. In one embodiment, the BTC schemes may encode each 4×4 pixel block of the image content as 32 bits. A larger fixed compression ratio may yield greater compression at the cost of reduced quality. Likewise, a smaller fixed compression ratio may yield lesser compression but may result in higher quality compression. Regardless of size, such an encoding scheme may be lossy in nature. BTC content, encoded with a fixed compression ratio, may, however, enable a memory controller, for example, a memory controller of a GPU, to read directly from the hardware. Some examples of BTC schemes with a fixed compression ratio that may be used in various embodiments include: S3 Texture Compression (S3TC), which may also may known as DXTn or DXTC, PVRTC-I, PVRTC-II, and Ericsson Texture Compression (ETC). Each BTC version may be compatible with certain graphics hardware. For example, one GPU may be compatible with S3TC encoded content while another GPU may be compatible with ETC encoded content. In one embodiment, the image content may be encoded with each of S3TC, PVRTC, and ETC schemes, such that the image content may be compatible with a broad range of hardware. Various BTC schemes may be included in a library on a server from which the encoding may be performed.

At 120, the different block truncation encoded versions of the image content may be combined into a single data structure. For instance, in an embodiment where the image content is encoded/compressed using each of S3TC, PVRTC, and ETC schemes, the encoded versions (e.g., S3TC encoded image content, PVRTC encoded image content, and ETC encoded image content) may be combined into a single data structure. The single data structure may be a single file for storage, loading, and/or transmission. In one embodiment, the combined single data structure may be structured by block truncation encoded version. Accordingly, in the example with S3TC, PVRTC, and ETC versions, the first portion of the data structure may be the S3TC encoded content, the middle portion the PVRTC encoded content, and the last portion, the ETC encoded content. The data structure may be structured in a different manner than sequentially by format type. In one embodiment, each encoded type may be divided before combining into the single data structure such that the compressed formats may be interspersed throughout the data structure, for example, by channel. The data structure may include headers or other formatting so that the appropriate portions of the data structure may be parsed by a media content delivery protocol. The file may then be stored to a storage medium (e.g., a hard disk), or may be delivered to a client.

Figure 2:
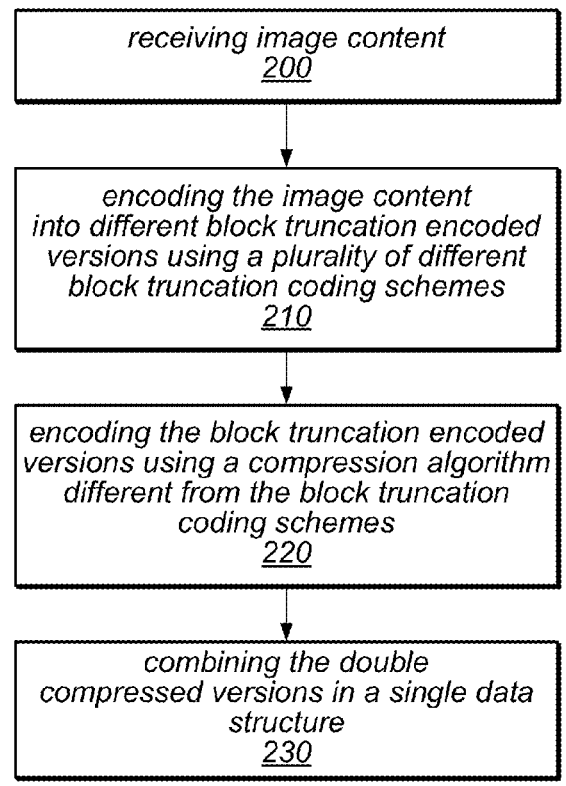
FIG. 2 is a flowchart of another method for encoding image content and combining encoded versions, according to some embodiments.

FIG. 2 illustrates another embodiment for encoding image content and combining encoded versions. While the blocks are shown in a particular order for ease of understanding, other orders may be used. In some embodiments, the method of FIG. 2 may include additional (or fewer) blocks than shown. Blocks 200-230 may be performed automatically or may receive user input.

At 200 and 210, image content may be received and may be encoded into different block truncation encoded versions using a plurality of different block truncation coding (BTC) schemes. Accordingly, the receiving and encoding of blocks 200-210 may operate in the same or substantially the same manner as blocks 100-110 of FIG. 1, respectively.

As shown at 220, the block truncation encoded versions of the image content may be further encoded using a compression algorithm that is different from any of the block truncation encoding schemes used at 210. Further encoding may provide additional compression to the already compressed BTC content. In some manners, BTC schemes may not provide the most efficient compression. Moreover, additional compression may provide a more efficient encoding of the image content and may allow the combined data structure to be used in additional applications. In one embodiment, one or more of the BTC content versions may be compressed using a generalized algorithm (e.g., LZMA) over the full BTC content. BTC content may include words composed of constituent components, as described at FIG. 3. In an embodiment where the entire BTC content is encoded using a single overall compression algorithm, the words may not need to be de-interleaved into constituent components before performing the additional encoding. By splitting into constituent components, however, additional bandwidth and performance gains may be achieved. If the combined file may not be used for transmission, though, bandwidth considerations may not be as significant and an overall, generalized additional compression of the BTC content may be sufficient.

Figure 3:
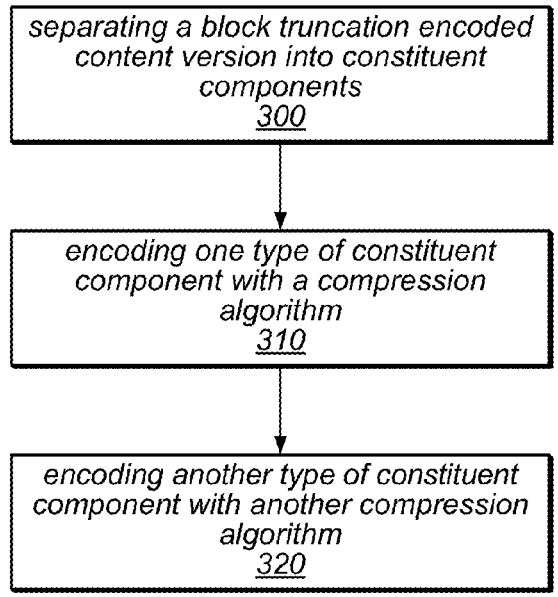
FIG. 3 is a flowchart of a method for further compressing the encoded image content, according to some embodiments.

FIG. 3 illustrates one embodiment of further encoding one or more of the block truncation encoded versions. While the blocks are shown in a particular order for ease of understanding, other orders may be used. In some embodiments, the FIG. 3 may include additional (or fewer) blocks than shown. Blocks 300-320 may be performed automatically or may receive user input.

Figure 9A:
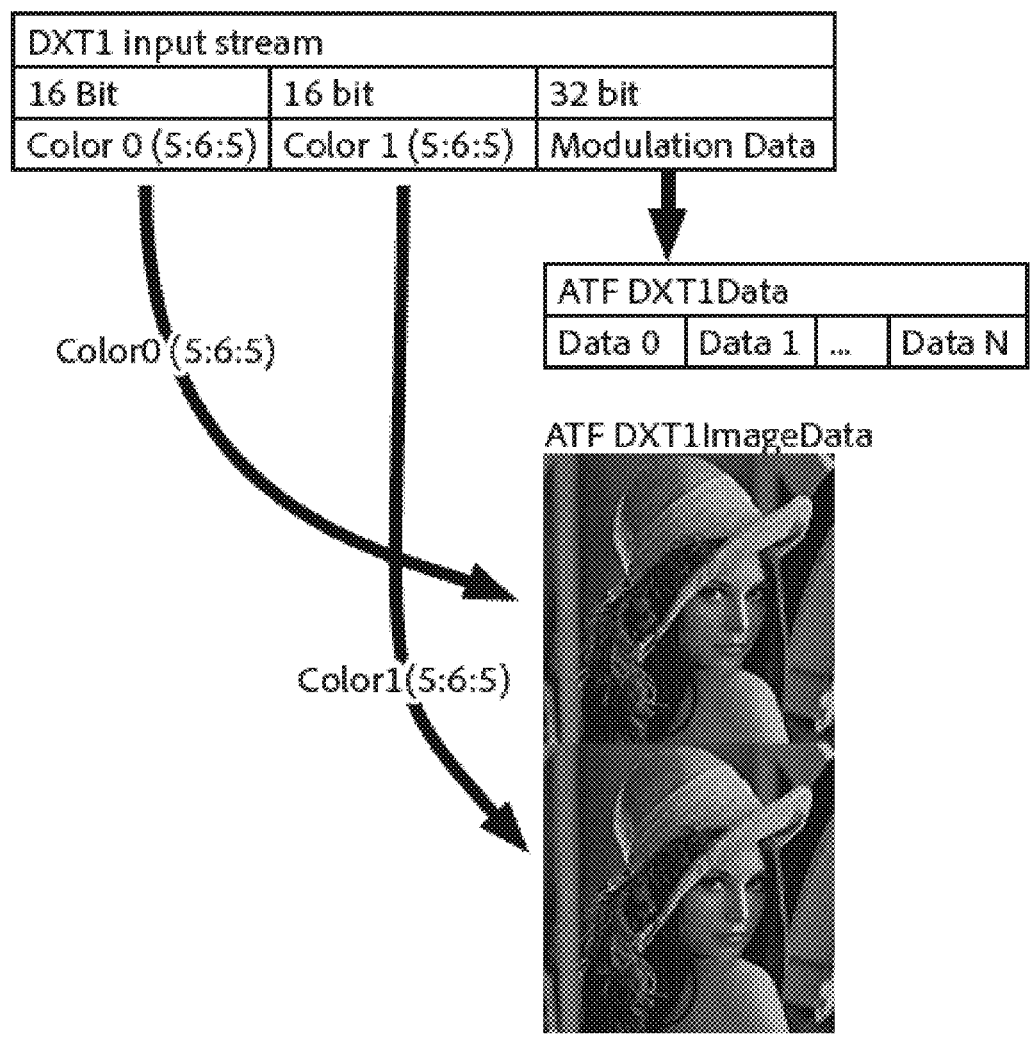
FIGS. 9a-9c illustrate examples for splitting DXT1 content, PVRTC content, and ETC1 content into constituent components, according to some embodiments.
Figure 9B:
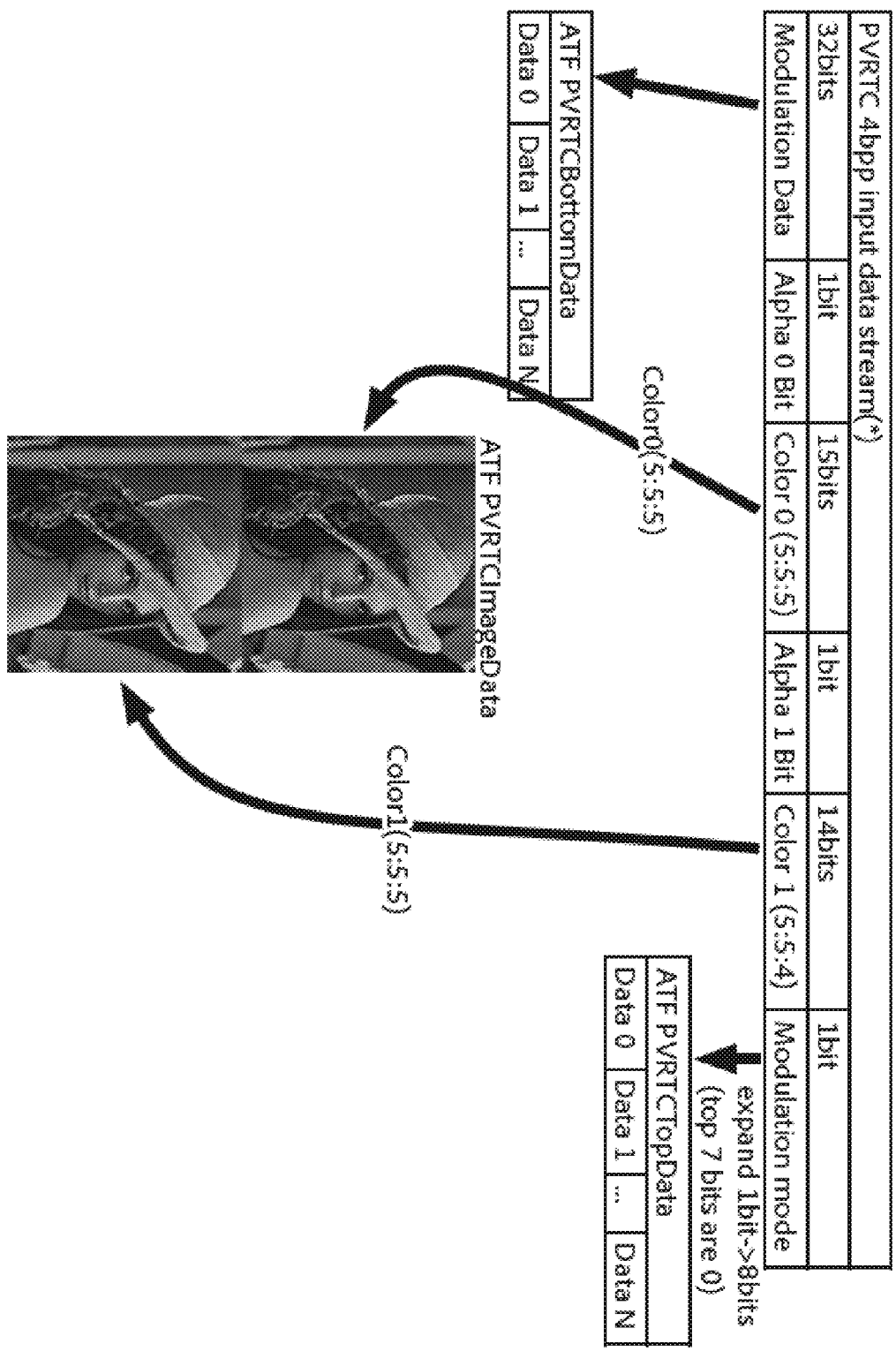
Figure 9C:
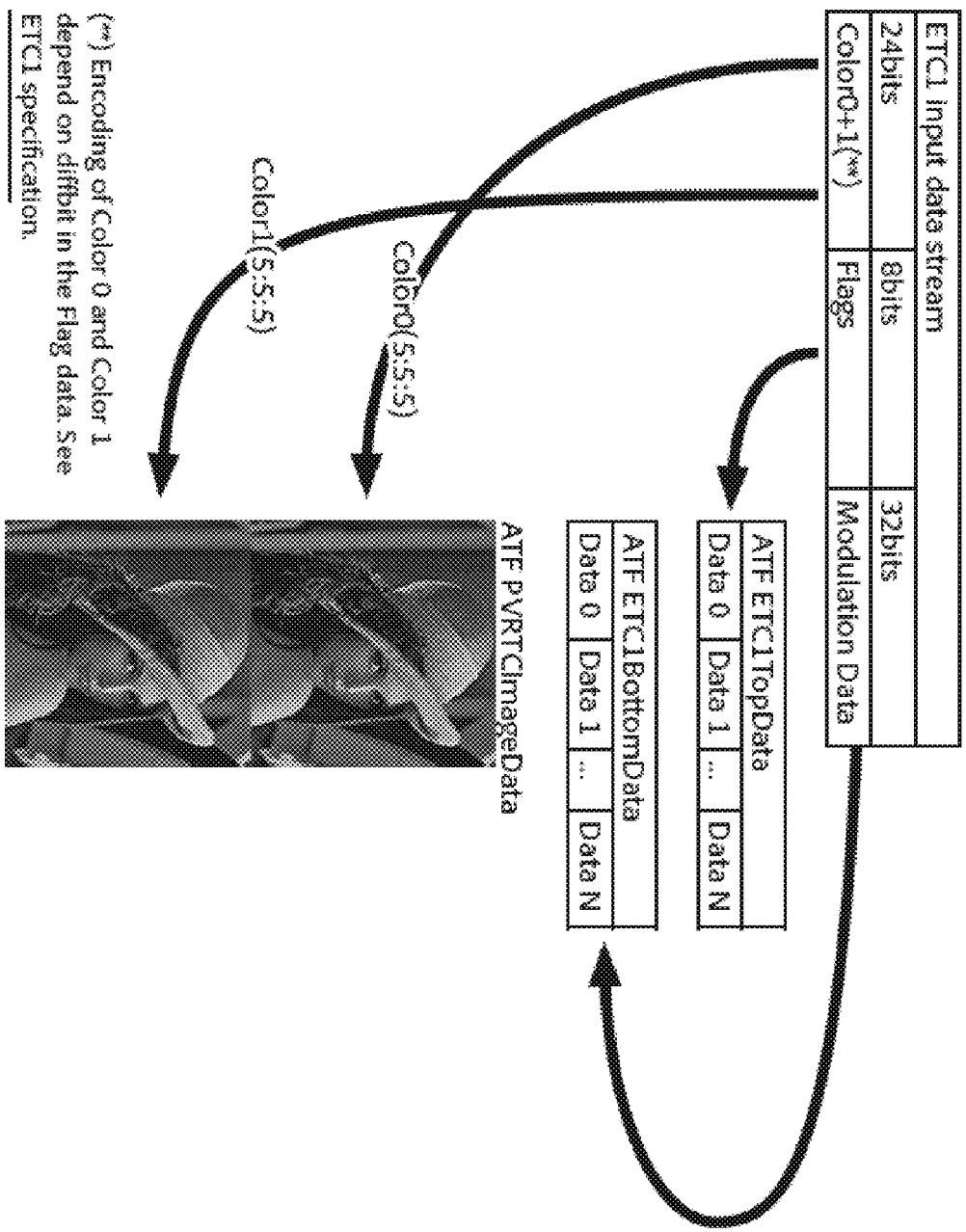

As illustrated at 300, one or more of the block truncation encoded content versions may be separated into constituent components. Block truncation encoded versions of image content, such as S3TC, PVRTC, and ETC versions, may each consist of constituent components, or channels. The number of channels and types of channels may vary based on the type of BTC. As one example, the constituent components of BTC content may include an image part and a residual part. The image part may include two color components and the residual part may include a selector/modifier component. The two color components and the selector/modifier component may be interleaved into words. In one embodiment, separating the block truncation encoded content version into constituent components may include de-interleaving or splitting the block truncation encoded content into its respective image part and residual part. FIGS. 9a-9c illustrate examples for splitting DXT1 content, PVRTC content, and ETC1 content into constituent components, respectively. In one embodiment, PVRTC content may need to be de-twiddled before splitting the content.

At 310, one type of constituent component may be encoded with a compression algorithm. The type of constituent component may correspond to the image portion of the compressed content. For the compressed content, each stream (e.g., image part, residual part) may be compressed using an algorithm that is different from the BTC schemes used in the initial encoding. Some streams may tolerate lossy compression algorithms while other streams may tolerate lossless compression algorithms. In one embodiment, the two color image streams may be compressed using color compression technologies such as JPEG, PNG, JPEG-XR, which may be lossless or lossy.

As shown at 320, another type of constituent component may be encoded with another compression algorithm. The another type of constituent component may, in some embodiments, correspond to the residual part of the BTC content. Similar to encoding the image part of the BTC content, the residual part of the BTC content may also be compressed using an algorithm that is different from the BTC schemes used in the initial encoding. In one embodiment, the algorithm used to compress the residual part of the BTC content may also be different from the algorithm used to compress the image part of the BTC content. For example, the selector/modifier stream may include noisy data and may be compressed using an all purpose, standard image compression algorithm like LZ77/Huffman or LZMA, which may be lossless.

Turning back to FIG. 2, at 230, the double compressed block truncation encoded versions of the image content may be combined into a single data structure. Block 230 may be substantially similar to block 120 with the exception that one or more of the BTC versions may include an additional layer of compression, generalized or by constituent component type, before combining into the single data structure. Double compressed or doubly compressed refers to the additional layer of compression/encoding.

Packaging multiple block truncation encoded versions of image content may offer many advantages. First, it may allow content creators to design texture packages that support most existing GPUs. Further, using asymmetric image compression schemes, such as block truncation encoding schemes, at the time of content authoring may allow media players to avoid recompression at run time thereby reducing latency. Moreover, by further encoding the multiple block truncation encoded versions, additional time, bandwidth, and storage gains may be achieved.

An example encoding and combination of media content, which may correspond to one or more of the encoding techniques of FIGS. 1-3 may be represented as follows, where ATF format may be a data stream for storage, loading, and/or transmission:

| Field | Type | Comment |
|---|---|---|
| | | ATF |
| Signature | U8[3] | Always 'ATF'. |
| Length | U24 | Size of ATF file in bytes, does include signature bytes and this length field. |
| Cubemap | UB[1] | 0 = normal texture<br>1 = cube map texture |
| Format | UB[7] | 0 = RGB888<br>1 = RGBA88888<br>2 = Compressed |
| Log2Width | U8 | Width of texture expressed as. 2^Log-2Width. Maximum value allowed is 11. |
| Log2Height | U8 | Height of texture expressed as 2^Log2Height. Maximum value allowed is 11. |
| Count | U8 | Total number of textures encoded per face. Maximum value allowed is 12. |
| TextureData | If Cubemap == 0 {<br>  If Format ==0<br>    ATFRGB888[Count]<br>  If Format == 1<br>    ATFRGBA8888[Count]<br>  If Format == 2<br>    ATFCOMPRESSED[Count]<br>}<br>if Cubemap == 1 {<br>  If Format == 0<br>    ATFRGB888[6][Count]<br>  If Format == 1<br>    ATFRGBA8888[6][Count]<br>  If Format == 2<br>    ATFCOMPRESSED[6][Count]<br>} | The first image encoded is the main texture image encoded at the size specified above. Each consecutive image encoded contains the next mip map level of that main image.<br>Cube maps contain 6 faces. They are placed in the following order: [−X, +X, −Y, +Y, −Z, +Z], i.e. [Left, Right, Bottom, Top, Back, Front] |
| | | ATFRGB888 |
| Length | U24 | Length of payload data in bytes |
| Data | U8[Length] | JPEG-XR data (JXRC_FMT_24bppRGB) |
| | | ATFRGBA8888 |
| Length | U24 | Length of payload data in bytes |
| Data | U8[Length] | JPEG-XR data (JXRC FMT_32bppBGRA) |
| ATFCOMPRESSED | | |
| DXT1DataLength | U24 | Length of DXT1 data in bytes |
| DXT1Data | U8[DXT1Datalength] | LZMA compressed DXT1 data |
| DXT1ImageDatalength | U24 | Length of DXT1 image data in bytes |
| DXT1ImageData | U8[DXT1ImageDataLength] | JPEG-XR data (JXRC_FMT_16bppBGR565) |
| PVRTCTopDataLength | U24 | Length of PVRTC4bpp top data in bytes |
| PVRTCTopData | U8[PVRTCTopDataLength] | LZMA compressed PVRTC top data |
| PVRTCBottomDataLength | U24 | Length of PVRTC4bpp bottom data in bytes |
| PVRTCBottornData | U8[PVRTCBottomDataLength] | LZMA compressed PVRTC bottom data |
| PVRTCImageDataLength | U24 | Length of PVRTC4bpp image data in bytes |
| PVRTCImageData | U8[PVRTCImageDataLength] | JPEG-XR data (JXRC_FMT_16bppBGR555) |
| ETC1TopDataLength | U24 | Length of ETC1 top data in bytes |
| ETC1TopData | U8[ETC1TopDataLength] | LZMA compressed ETC1 top data |
| ETC1BottomDatalength | U24 | Length of ETC1 bottom data in bytes |
| ETC1BottomData | U8[ETC1BottomDataLength] | LZMA compressed ETC1 bottom data |
| ETC1ImageDataLength | U24 | Length of ETC1 image data in bytes |
| ETC1ImageData | U8[ETC1ImageDataLength] | JPEG-XR data (JXRC_FMT_16bppBGR555) |

The data in this example is represented in three different block truncation coding formats: DXT1, PVRTC, and ETC1. Respective portions of each of the three BTC versions are further compressed with LZMA and JPEG-XR. For example, the noisy channel portion may be compressed with LZMA and the color channel portions may be compressed with JPEG-XR. Note that the DXT1 data is split differently than are the PVRTC and ETC1 data. In the example, the DXT1 data includes a single LZMA compressed portion while the PVRTC and ETC1 data each include two LZMA compressed portions, corresponding to top and bottom data.

Applying additional compression to already compressed content and packaging the doubly-compressed media content together into a single data structure may yield a multi-format data structure that is smaller than any of the compressed versions individually. In other words, a data structure containing each of S3TC, PVRTC, and ETC encoded content, with each compressed a second time, may be smaller than a data structure that contains only one of S3TC, PVRTC, or ETC data. In addition, by using different compression schemes for different parts of the BTC content, patterns and predictability for channels that can tolerate lossy algorithms may be exploited and generalized lossless algorithms may be applied to noisy generalized channels. As a result, an improved overall compression ratio may be achieved.

Figure 4:
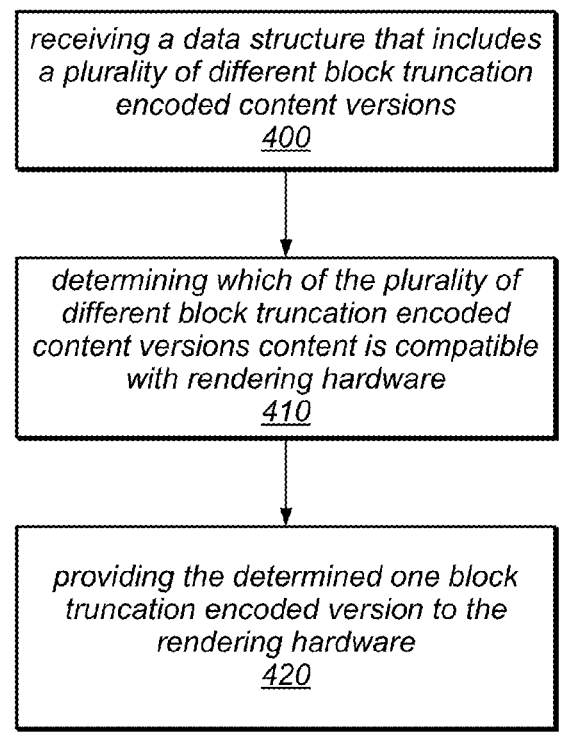
FIG. 4 is a flowchart of a method for selecting a format of compressed media content and providing the selected format to rendering hardware, according to some embodiments.

Turning now to FIG. 4, one embodiment for selecting a version of compressed media content and providing the selected version to rendering hardware is shown. While the blocks are shown in a particular order for ease of understanding, other orders may be used. In some embodiments, the method of FIG. 4 may include additional (or fewer) blocks than shown. Blocks 400-420 may be performed automatically or may receive user input.

At 400, a data structure may be received, for example, at a computing device, that may include a plurality of different block truncation encoded versions of image content. In one embodiment, a media content delivery protocol (e.g., media player) on a computing device may receive the data structure with the multiple BTC versions. The data structure may be received, in one embodiment, at run time. The media player may reside on a computing device, and may utilize a scripting engine. The computing device may include multiple processors. For example, the multiple processors may include one or more CPUs and one or more GPUs. The plurality of different BTC versions may include DXT1, ETC1, PVRTC-I, PVRTC-II, among other BTC versions. The received data structure may be in the ATF format, shown above.

As indicated at 410, which of the plurality of block truncation encoded versions is compatible with rendering hardware (e.g., GPU) may be determined. A GPU of the computing device may include the capability to encode and decode a certain type of BTC format. In one embodiment, the media player may detect, at run time, which BTC format is compatible with the available GPU on the computing device. For example, the media player may detect that the GPU is compatible with ETC texture compression. Accordingly, the media player may determine that the ETC encoded content is the appropriate format for the rendering hardware of the computing device. In one embodiment, a media player may detect rendering hardware before run time (e.g., at power up, at period intervals, etc.) such that by the time the data structure is received at 400, the media player already knows which format is compatible with the rendering hardware. In such a case, when the data structure is received by the media player, the media player may not need to determine which BTC format is hardware compatible but, instead, may provide the compatible BTC content directly to the rendering hardware, as in block 320. In one embodiment, the decompressor's front-end may receive the data structure and select the hardware appropriate format. The overall data structure may include formatting and/or headers that may be parsed so that the appropriate format may be selected and provided to the rendering hardware for decoding. In one embodiment, multiple GPUs may exist on a computing device, each of which may be compatible with various BTC formats. The player may prioritize based on computing device and/or user preferences to determine which format to select. In one embodiment, each compatible format may be selected and, at 420, provided to the appropriate hardware capable of decoding the data.

As illustrated at 420, the determined compatible block truncation encoded version may be provided to rendering hardware. In one embodiment, the determined/selected BTC content may be directly uploaded to memory of the graphics hardware, such as a GPU, and may be decoded by the GPU. Thus, if the GPU is ETC format compatible, then the ETC encoded content may be passed from the media player to the GPU for rendering the image content.

Figure 5:
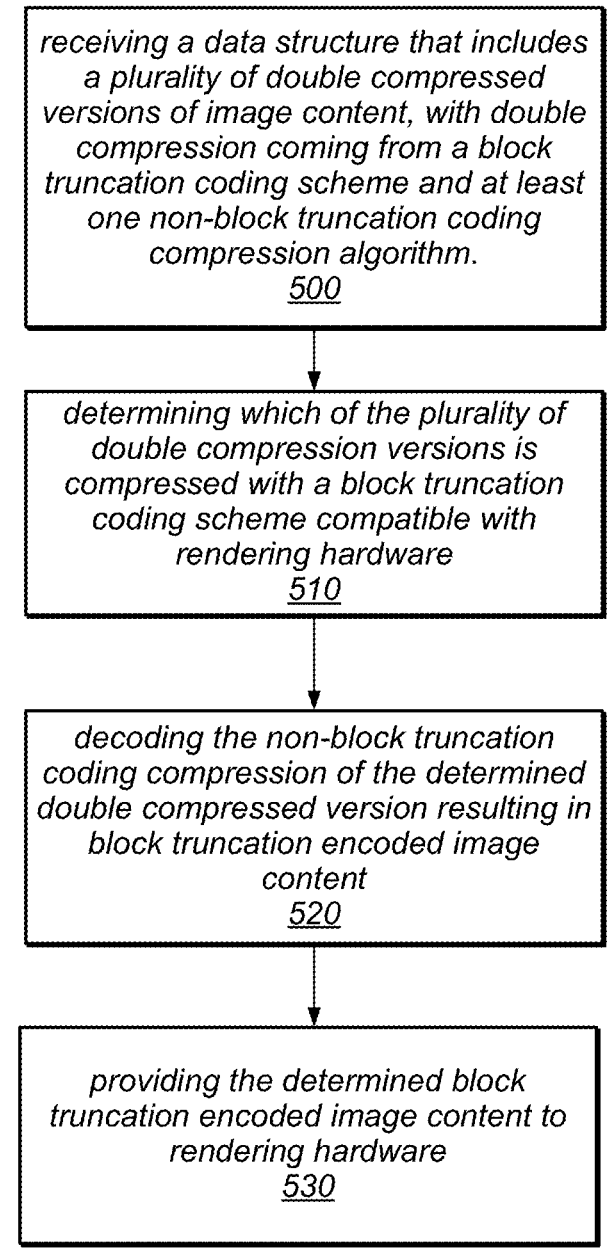
FIG. 5 is a flowchart of another method for selecting a format of compressed media content and providing the selected format to rendering hardware, according to some embodiments.

FIG. 5 illustrates another embodiment for selecting a format of compressed media content and providing the selected format to rendering hardware. While the blocks are shown in a particular order for ease of understanding, other orders may be used. In some embodiments, the method of FIG. 5 may include additional (or fewer) blocks than shown. Blocks 500-530 may be performed automatically or may receive user input.

As shown at 500, a data structure may be received, for example, at a computing device, that may include a plurality of double compressed versions of image content. In one embodiment, a double compressed version may include image content first encoded with a block truncation encoding scheme, and encoded a second time with a compression algorithm that is not a block truncation encoding scheme. As in block 400, a media content delivery protocol (e.g., media player) on a computing device may receive the data structure with the multiple BTC versions. In one embodiment, the received BTC versions may be further encoded. Each version may be further encoded with an overall compression algorithm (e.g., LXMA, Huffman, etc.), or may be further encoded by channel such that multiple additional compression algorithms may be used. For instance, color channels may be further compressed using JPEG, JPEG-XR, PNG, or other comparable schemes while selector channels may be compressed using an all purpose compression algorithm, such as LZ77/Huffman, LZMA, or other comparable algorithms. Thus, the received data structure may, in one embodiment, include multiple BTC versions with each BTC version including additional compression, which may be a different additional compression for different portions of the BTC content.

At 510, which of the plurality of double compressed versions is compressed with a BTC scheme compatible with rendering hardware may be determined. Block 510 may operate in the same or substantially the same manner as blocks 410 of FIG. 4.

At 520, the additional layer of compression (the non-block truncation coding compression) of the determined double compressed version may be decoded. In various embodiments, the selected data structure may include an additional layer of encoding other than the BTC encoding. For example, the stream may be further compressed using an algorithm, such as LZMA, or multiple algorithms. In one embodiment, the additional compression may be decompressed before the BTC content is provided to the rendering hardware at 530. For example, the CPU may decode any LZMA and/or JPEG-XR compression, for example, and provide the BTC encoded media to the GPU. In other words, the decoding may be performed in the opposite order in which the media content was encoded. Thus, the last levels of compression may be decoded first, and followed sequentially until reaching the initial compression. In some embodiments, various levels of compression may be decoded at the CPU and/or GPU. In one embodiment, only the selected BTC version may have its additional compression decompressed such that resources may not be used on BTC versions that may not be compatible with the rendering hardware of a computing device. In some embodiments, the BTC encoded format may include de-interleaved words, which may have been de-interleaved to optimize compression (e.g., JPEG-XR for color channels, and LZMA for selector channels). In such embodiments, before providing the BTC encoded content to the GPU at 530, the words may be re-interleaved.

As illustrated at 530, the determined compatible block truncation encoded version, which may have had additional compression decompressed at 520, may be provided to rendering hardware of the computing device. In one embodiment, the determined/selected BTC content may be directly uploaded to memory of the graphics hardware, such as a GPU, and may be decoded by the GPU. Thus, if the GPU is ETC format compatible, then the ETC encoded content may be provided from the media player to the GPU for rendering the image content.

Returning to the ATF format detailed above, consider a media player running on a system that supports ETC1. The decompressor's front-end may receive data in the example ATF format above. A software client may parse the header of the formatted data and select the appropriate format for the system's hardware. In the above example, the software client may skip over the DXT1 and PVRTC data and detect the proper compressed texture type, ETC1. The software client may decode/decompress the ETC1 data. Next, the software client may interleave the ETC1 data such that the resulting interleaved ETC1 data may be fully compatible with any hardware requirements. The interleaved ETC1 data may be passed directly to the GPU where the GPU may render the image data. For example, the GPU may render texture as part of a 3D scene.

By receiving multiple BTC formats of media content in a single stream, recompressing textures on the client, which may be lead to run time delays (and additional run time memory requirements), may be avoided. As a result, quality and performance of the rendering may be improved. Further, including the capability to select an appropriate format from multiple formats may further result in quality and performance gains by not requiring unusable formats to be decompressed as well.

FIG. 6a illustrates an example of encoding a RAW format input texture, according to some embodiments. As shown, the input RAW texture is a texture of a brick wall. The input texture may be provided to multiple encoders. In the example shown, the input texture is provided to a DXT1 encoder, ETC1 encoder, PVRTC encoder, and to another BTC encoder. Each of the four BTC encoded versions of the input texture may then be further compressed. As shown, each version is compressed using a lossless encoder. The resulting four versions are shown combined together as a single file for storage/loading/transmission, or ATF file.

FIG. 6b illustrates further detail of encoding the input texture. As shown, the input texture has been encoded from RAW to PVRCT using a fixed size such that every 4×4 block is encoded as 32 bits. After encoding the texture into PVRCT, the PVRCT-encoded content is shown split into constituent parts, an image part and residual part. The image part and residual part may correspond to the color channels and selector channel, described above. As shown, the image part may be compressed with an algorithm. The algorithm in FIG. 4b is a lossless algorithm, JPEG-XR, but other lossy or lossless algorithms may be used. The residual part is shown being compressed with a lossless algorithm, LZMA, however, other comparable algorithms may be used. Following the additional compression, the compressed image part and compressed residual part may be combined together into a single file. As shown in FIG. 4a, the various BTC versions, which may be further compressed as described in FIG. 4b, may be combined together into a single data stream, as an ATF file.

FIG. 6c illustrates an example of selecting a version of compressed image content and providing the selected format to rendering hardware, according to some embodiments. As shown, an ATF file may be received. A BTC encoded version may be selected based on runtime detected hardware. In the example illustrated, the detected hardware is compatible with the PVRTC format. In other embodiments, hardware compatibility may be determined before runtime. Following the next arrow in the figure, the PVRTC data may be decoded using a lossless decoder. The lossless decoder may correspond to the lossless compression algorithm used in the encoding process. As applied to the content encoded in FIG. 4b, the PVRTC lossless decoder may apply the respective decoding technique, JPEG-XR, and LZMA to the corresponding parts of the PVRTC format. The image part, which may include two color channels, and the residual part, may then be re-interleaved together into words. The re-interleaved PVRTC format may be uploaded to the GPU where the GPU may decode the PVRTC format. As shown, the GPU may render the texture as part of a 3D scene. Here, the GPU applies the brick texture to a 3D scene of a wall.

Example Implementations

Figure 7:
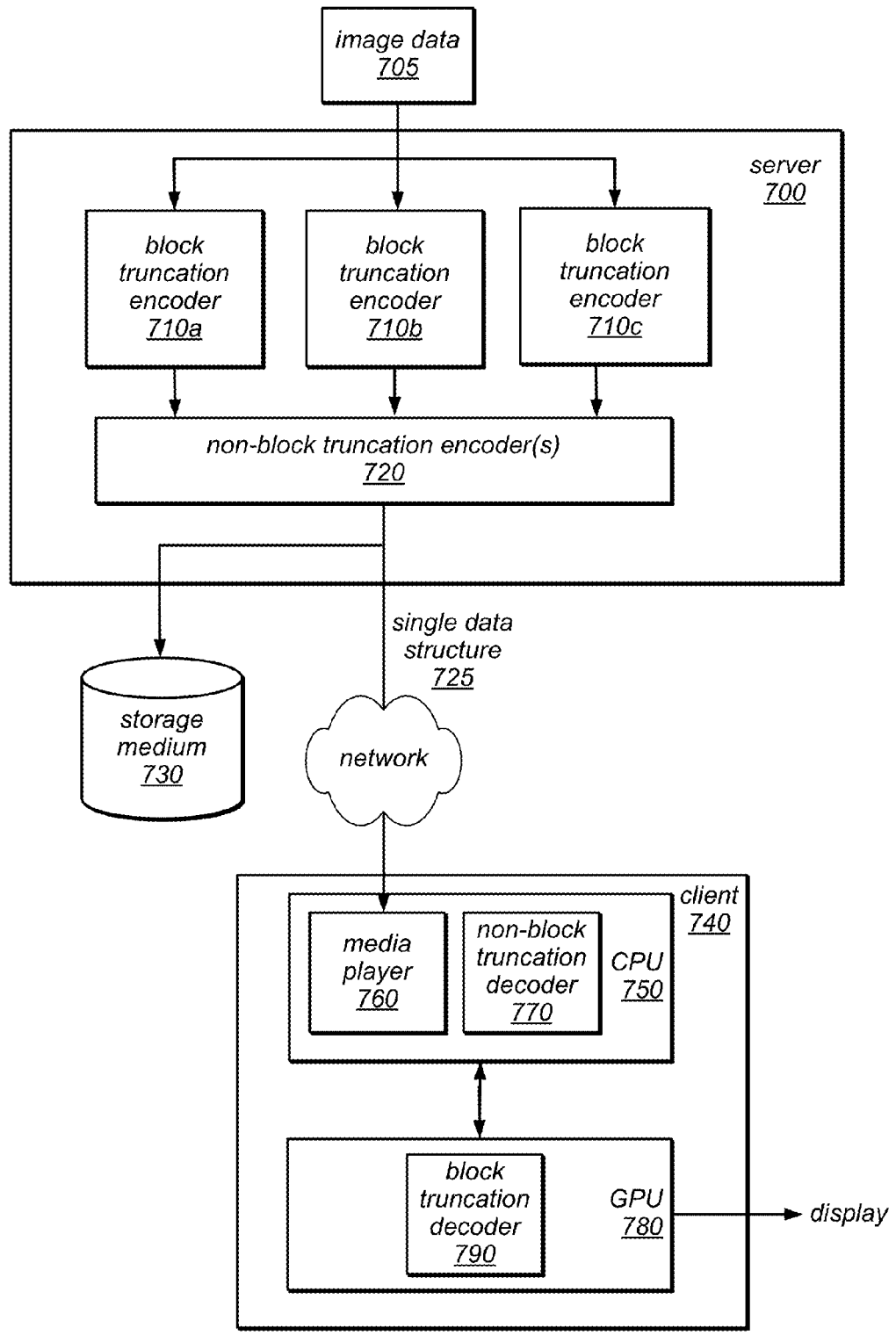
FIG. 7 illustrates an example server and an example client that may implement encoding image content and combining encoded versions, according to some embodiments.

FIG. 7 illustrates a server 700 that may implement one or more of the encoding and combining techniques illustrated in FIGS. 1-3 and a client 740 that may implement one or more of the receiving, determining, and providing techniques of FIGS. 4-5. Server 700 may include a plurality of block truncation encoders 710a-710c, that may collectively be known as a library. In the illustrated embodiment, server 700 includes three block truncation encoders 710. Server 700 may further include one or more non-block truncation encoders 720. Non-block truncation encoders 720 are non-block truncation encoders in the sense that they implement an encoder that does not use a BTC scheme. For example, non-block truncation encoders 720 may implement one or more of JPEG-XR, JPEG, PNG, LZMA, or Huffman schemes, among others. Server 700 may receive, as input, image data 705. Image data 705 may, in various embodiments, be encoded with a plurality of block truncation encoders 710 and may be further encoded with one or more non-block truncation encoders 720. The encoded image data 705 may be combined to form single data structure 725, which may be provided over a network to client 740 and/or stored to storage medium 730, such as system memory, a disk drive, DVD, CD, etc.

Client 740 may include one or more processors, such as CPU 750 and GPU 780. CPU 750 may include a media player 760, which may receive single data structure 725, and non-block truncation decoder 770. Media player 760 may determine a BTC version compatible with GPU 780 and may provide the BTC version to non-block truncation decoder 770, if additional compression is to be removed. CPU 770 may provide the resulting decompressed, still BTC encoded content to GPU 780, for storage to GPU memory. GPU 780 may include block truncation decoder 790, which may decode the GPU-received BTC content for rendering at a display.

Example System

Figure 8:
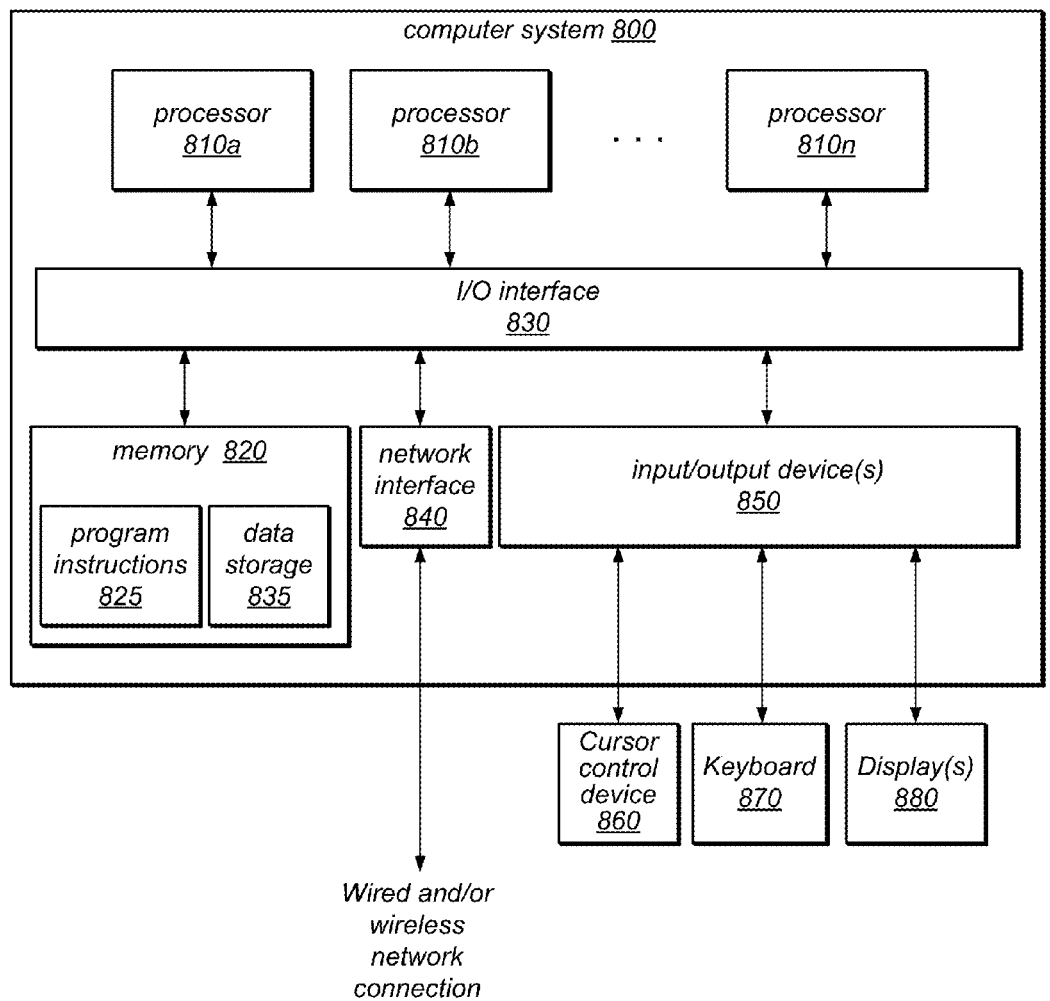
FIG. 8 illustrates an example computer system that may be used in embodiments.

Embodiments of the client and server and/or the various encoding, combining, selecting, and determining techniques as described herein may be executed on one or more computer systems, which may interact with various other devices. One such computer system is illustrated by FIG. 8. In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a GPU. A GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more APIs that permit programmers to invoke the functionality of the GPU(s). Suitable GPUs may be commercially available from vendors such as NVIDIA Corporation, ATI Technologies (AMD), and others.

GPUs, such as one or more of processors 810 may be implemented in a number of different physical forms. For example, GPUs may take the form of a dedicated graphics card, an integrated graphics solution and/or a hybrid solution. The dedicated graphics card may be a 3D graphics card. GPU 810 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts.

Integrated graphics solutions, or shared graphics solutions are graphics processors that utilize a portion of a computer's system RAM rather than dedicated graphics memory. For instance, modern desktop motherboards normally include an integrated graphics solution and have expansion slots avail able to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 810 and the rest of the computer system 800 may travel through a graphics card slot or other interface, such as I/O interface 830 of FIG. 8.

Note that program instructions 825 may be configured to implement a graphics application as a stand-alone application, or as a module of another graphics application or graphics library, in various embodiments. For example, in one embodiment program instructions 825 may be configured to implement graphics applications such as painting, editing, publishing, photography, games, animation, and/or other applications, and may be configured to provide the functionality described herein. In another embodiment, program instructions 825 may be configured to implement the techniques described herein in one or more functions or modules called by another graphics application executed on GPU 810 and/or processor(s) 810. These modules may be executable on one or more of CPUs 810 and/or GPUs 810 to cause computer system 800 to provide the functionality described herein. The graphics application may be implemented in various embodiments using any desired programming language, scripting language, or combination of programming languages and/or scripting languages, e.g., C, C++, C#, Java™, Perl, etc. For example, in one embodiment, the graphics application may be JAVA based, while in another embodiments, it may be implemented using the C or C++ programming languages. In other embodiments, the graphics application may be implemented using specific graphic languages specifically for developing programs executed by specialized graphics hardware, such as a GPU. In addition, the graphics application may be embodied on memory specifically allocated for use by graphics processor(s), such as memory on a graphics board including graphics processor(s). Program instructions 825 may also be configured to render images and present them on one or more displays as the output of an operation and/or to store image data in memory 820 and/or an external storage device(s), in various embodiments.

System memory 820 may be configured to store program instructions and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an encoding module, a combining module, a selecting module and a decoding module are shown stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 825, configured to implement embodiments of an encoding module, a combining module, a selecting module, and a determining module as described herein, and data storage 835, comprising various data accessible by program instructions 825. In one embodiment, program instructions 825 may include software elements of embodiments of encoding, combining, selecting, and/or determining modules as illustrated in the above Figures. Data storage 835 may include data that may be used in embodiments. In other embodiments, other or different software elements and data may be included.

Those skilled in the art will appreciate that computer system 800 is merely illustrative and is not intended to limit the scope of encoding, combining, selecting, and/or determining modules, as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
receiving image content;
encoding the image content into block truncation encoded versions, the encoding including using a different block truncation coding scheme for each of the block truncation encoded versions;
compressing each of the block truncation encoded versions with a compression algorithm different from the block truncation coding schemes; and
combining the block truncation encoded versions of the image content into a single data structure.

2. The method of claim 1, wherein the block truncation encoded versions of the image content include at least an ETC1 encoded version, a PVRTC encoded version, and a DXT1 encoded version.

3. The method of claim 1, wherein each of the block truncation encoded versions are said compressed before said combining the block truncation encoded versions of the image content into the single data structure.

4. The method of claim 1, wherein said compressing one of the block truncation encoded versions of the image content comprises:
separating the block truncation encoded version into constituent components;
encoding one type of the constituent components with a first compression algorithm; and
encoding another type of the constituent components with a second compression algorithm.

5. The method of claim 4, wherein the constituent components of the block truncation encoded version of the image content include two color components and a selector/modifier component interleaved into words, and wherein said separating the block truncation encoded version includes de-interleaving the words.

6. The method of claim 4, wherein said encoding the one type of the constituent components with the first compression algorithm includes compressing two color image components with a color compression scheme, wherein the color compression scheme includes at least one of JPEG, PNG, or JPEG-XR.

7. A non-transitory computer-readable storage medium storing program instructions, wherein the program instructions are computer-executable to implement:
receiving image content;
compressing the image content into a plurality of block truncation encoded content versions, wherein said compressing includes using a different block truncation coding scheme for each of the plurality of block truncation encoded content versions;
compressing each of the block truncation encoded content versions with a compression algorithm different from the block truncation coding schemes; and
combining the plurality of block truncation encoded content versions of the image content into a single data structure.

8. The non-transitory computer-readable storage medium of claim 7, wherein the wherein the plurality of block truncation encoded content versions includes at least an ETC1 encoded version, a PVRTC encoded version, and a DXT1 encoded version.

9. The non-transitory computer-readable storage medium of claim 7, wherein the program instructions are further computer-executable to implement said compressing each of the block truncation encoded content versions before said combining the plurality of block truncation encoded content versions of the image content into the single data structure.

10. The non-transitory computer-readable storage medium of claim 7, wherein further compressing one of the block truncation encoded content versions comprises:
separating the block truncation encoded content version into constituent components;
encoding one type of the constituent components with a first compression algorithm; and
encoding another type of the constituent components with a second compression algorithm.

11. The non-transitory computer-readable storage medium of claim 10, wherein the constituent components of the block truncation encoded content version include two color components and a selector/modifier component interleaved into words, and wherein said separating the block truncation encoded content version includes de-interleaving the words.

12. The non-transitory computer-readable storage medium of claim 10, wherein said encoding the one type of the constituent components with the first compression algorithm includes compressing two color image components with a color compression scheme, wherein the color compression scheme includes at least one of JPEG, PNG, or JPEG-XR.

13. A computing device, comprising:
a memory device configured to maintain image content;
a processing system to implement one or more encoding modules that are configured to:
encode the image content into block truncation encoded versions of the image content using a different block truncation coding scheme for each of the block truncation encoded versions of the image content;
compress each of the block truncation encoded versions of the image content with one or more compression algorithms that are different than the block truncation coding schemes; and
combine the block truncation encoded versions of the image content into a single data structure.

14. The computing device as recited in claim 13, wherein the one or more encoding modules are configured to encode the image content as:
an Ericsson Texture Compression (ETC1) encoded version;
a PowerVR Texture Compression (PVRTC) encoded version; and
an S3 Texture Compression (DXT1) encoded version.

15. The computing device as recited in claim 13, wherein the one or more encoding modules are configured to compress each of the block truncation encoded versions of the image content before the block truncation encoded versions are combined into the single data structure.

16. The computing device as recited in claim 13, wherein, to compress one of the block truncation encoded versions of the image content, an encoding module is configured to:
separate the block truncation encoded version of the image content into constituent components;
encode one type of the constituent components with a first compression algorithm; and
encode another type of the constituent components with a second compression algorithm.

17. The computing device as recited in claim 16, wherein the constituent components of the block truncation encoded version of the image content include two color components and a selector/modifier component.

18. The computing device as recited in claim 17, wherein the first compression algorithm includes a color compression scheme, and the encoding module is configured to compress the two color components as one of JPEG, PNG, or JPEG-XR.

19. The computing device as recited in claim 17, wherein the second compression algorithm is a lossless compression algorithm, and the encoding module is configured to compress the selector/modifier component as LZMA.

* * * * *